US010897896B2

(12) United States Patent
Olds et al.

(10) Patent No.: US 10,897,896 B2
(45) Date of Patent: Jan. 26, 2021

(54) HIGH LOAD AQUEOUS SUSPENSION CONCENTRATE OF AN ACTIVE INGREDIENT

(71) Applicant: Dow AgroSciences LLC, Indianapolis, IN (US)

(72) Inventors: Melissa G. Olds, Zionsville, IN (US); Holger Tank, Zionsville, IN (US); Toshiya Ogawa, San Ramon, CA (US)

(73) Assignee: Dow AgroSciences LLC, Indianapolis, IN (US)

( * ) Notice: Subject to any disclaimer, the term of this patent is extended or adjusted under 35 U.S.C. 154(b) by 0 days.

(21) Appl. No.: 13/713,109

(22) Filed: Dec. 13, 2012

(65) Prior Publication Data

US 2013/0157853 A1    Jun. 20, 2013

Related U.S. Application Data

(60) Provisional application No. 61/576,144, filed on Dec. 15, 2011.

(51) Int. Cl.
| | | |
|---|---|---|
| *A01N 33/18* | (2006.01) | |
| *A01N 25/04* | (2006.01) | |
| *A01N 25/10* | (2006.01) | |

(52) U.S. Cl.
CPC ............ *A01N 33/18* (2013.01); *A01N 25/04* (2013.01); *A01N 25/10* (2013.01)

(58) Field of Classification Search
CPC ......... A01N 33/18; A01N 25/10; A01N 25/04
See application file for complete search history.

(56) References Cited

U.S. PATENT DOCUMENTS

| | | | |
|---|---|---|---|
| 4,303,642 A | 12/1981 | Kangas | |
| 5,154,749 A | 10/1992 | Dorman et al. | |
| 5,188,824 A * | 2/1993 | Wessling et al. | ............ 424/78.1 |
| 5,321,049 A | 6/1994 | Smith et al. | |
| 5,834,006 A | 11/1998 | Smith et al. | |
| 2003/0161856 A1 * | 8/2003 | Tandt et al. | .................... 424/405 |
| 2005/0239653 A1 * | 10/2005 | Sievernich et al. | .......... 504/128 |
| 2007/0027034 A1 | 2/2007 | Tank et al. | |
| 2008/0103044 A1 | 5/2008 | Tang et al. | |
| 2008/0317702 A1 | 12/2008 | Edgington et al. | |
| 2009/0227459 A1 | 9/2009 | Xu et al. | |
| 2011/0081555 A1 | 4/2011 | Liu et al. | |
| 2013/0337162 A1 * | 12/2013 | Wiercinski | ................ C09J 7/20 427/177 |

FOREIGN PATENT DOCUMENTS

| | | |
|---|---|---|
| EP | 0381691 | 10/1992 |
| EP | 0393069 | 8/1993 |
| EP | 1286588 | 12/2005 |
| GB | 758019 | 9/1956 |
| JP | H0350I845 | 4/1991 |
| JP | 2007314515 | 6/2007 |
| WO | 199507614 | 3/1995 |
| WO | 2007093232 | 12/2010 |
| WO | 2011006896 | 1/2011 |

OTHER PUBLICATIONS

Metazachlor entry in ChemSpider [online], retrieved on (Oct. 28, 2019) from URL <https://pubchem.ncbi.nlm.nih.gov/compound/49384#section=Crystal-Structures&fullscreen=true>.*
Metazachlor crystalline structure entry from PubChem [online], retrieved on (Oct. 28, 2019) from URL <http://www.chemspider.com/Chemical-Structure.44885.html>.*
International Search Report and written Opinion for International Application No. PCT/US2012/069374, dated Apr. 1, 2013.

* cited by examiner

*Primary Examiner* — John Pak
*Assistant Examiner* — Daniel L Branson

(57) ABSTRACT

Embodiments of the invention include stable compositions comprising: an active ingredient, a dispersant, a latex, and water, wherein the active ingredient and the latex in the composition remain substantially separate. Further embodiments include methods of applying the compositions to an area to control undesirable plant growth, fungal pathogens or insects.

15 Claims, No Drawings

HIGH LOAD AQUEOUS SUSPENSION CONCENTRATE OF AN ACTIVE INGREDIENT

CROSS-REFERENCE TO RELATED APPLICATION

This application claims the benefit of U.S. Provisional Patent Application Ser. No. 61/576,144, filed Dec. 15, 2011, the disclosure of which is hereby incorporated herein in its entirety by this reference.

BACKGROUND OF THE INVENTION

It is generally desired that compositions of active ingredients should be easy to handle and easy to apply in any desired concentration. For this reason, herbicidal compositions are generally supplied in the form of wettable powders, emulsifiable concentrates and the like. In the formulation of emulsifiable concentrates, it is generally necessary to incorporate substantial quantities of organic solvents, and this can result in substantial problems of dermal toxicity and flammability. Furthermore, because of the presence of organic solvents, it is not possible, for many emulsifiable concentrate compositions, to utilize containers of conventional plastics materials, such as high density polyethylene (HDPE). Instead, such concentrates have to be contained within specially designed containers, which are resistant to the solvents used. In addition, the incorporation of high levels of organic solvents in emulsifiable concentrates gives rise to problems of phytotoxicity to crops when the pesticidal substances are utilized.

BRIEF SUMMARY OF THE INVENTION

Embodiments of the invention include stable compositions comprising: a crystalline active ingredient with a melting point of 70 degrees Celsius or less, a dispersant, a latex and water, wherein the active ingredient and the latex in the composition remain substantially separate and are dispersed as discrete particles in an aqueous phase. Further embodiments include methods of applying the composition to an area to control a plant, a fungus, or a pest.

DETAILED DESCRIPTION OF THE INVENTION

Embodiments include stable compositions comprising an aqueous solution of water, a dispersant, a latex, and a crystalline active ingredient. The active ingredient may be generally insoluble in water and may be present in the composition in a particle form. In embodiments, the particles of active ingredient are in a solid form that remains generally insoluble in water. In embodiments, the active ingredient may not be wholly or substantially associated with the latex. In embodiments, particles of the active ingredient and particles of the latex in the composition remain substantially separate. In embodiments, the compositions remain pourable at room temperature (about 20° C. to about 25° C.).

The term "particles," as used herein, is not meant to carry with it any implication as to the physical state (i.e., solid or liquid) unless otherwise specified (e.g., specifically termed solid or liquid), and specifically is intended to include within its scope droplets (e.g., of latex) and/or crystals or other solids.

As used herein, "generally insoluble in water" is not intended to signify that a particular component of the composition is totally insoluble in water, but only that a particular component of the composition is not freely soluble in water.

As used herein, "substantially separate" refers to the situation where particles of two or more dispersed phases are present within a solvent and wherein the particles of the two or more dispersed phases do not generally combine or agglomerate to form large particles, e.g., wherein the composition, as viewed under a microscope, retains separate and distinct particles of both dispersed phases.

The term "latex" as used herein includes any polymeric product produced as an aqueous suspension by an emulsion polymerization process and includes within its scope both synthetic and natural latexes. By way of example and not limitation, latexes may include polymers and copolymers of styrene, alkyl styrenes, isoprene, butadiene, acrylonitrile, lower alkyl acrylates, vinyl chloride, vinylidene chloride, vinyl esters of lower carboxylic acids and alpha, beta-ethylenically unsaturated carboxylic acids, including polymers containing three or more different monomer species copolymerized therein. Bifunctional vinyl monomers may be employed to crosslink the polymers. In a particular embodiment, the latex may be UCAR™ 162 latex as available from Arkema Inc. (King of Prussia, Pa.).

In embodiments, the latex may be present in the composition at from about 6 weight percent (wt %) to about 15 wt %. In certain embodiments the latex may be present in the composition at from about 8 wt % to about 15 wt %, from about 10 wt % to about 15 wt %, or from about 12 wt % to about 15 wt %. In further embodiments, the latex may be present when the active ingredient is initially mixed with water. Alternatively, a suspension of the active ingredient may first be formed by the combination of the water with the active ingredient and the resulting suspension thereafter combined with latex.

In embodiments, the dispersant may be present in the composition at from about 2 wt % to about 8 wt %. In certain embodiments, the dispersant may be present in the composition at from about 2 wt % to about 6 wt %, from about 3 wt % to about 7 wt %, from about 3 wt % to about 5 wt %, or from about 3.5 wt % to about 4.5 wt % In further embodiments, a dispersant (e.g., a surfactant) may be present when the active ingredient is initially mixed with water. Alternatively, a suspension of the active ingredient may first be formed by combination of the water with the active ingredient and the resulting suspension thereafter combined with the dispersant.

Dispersants which may be advantageously employed herein can be readily determined by those skilled in the art and include various nonionic, anionic, cationic or amphoteric dispersants, or a blend of two or more dispersants may be employed. The dispersant employed should be compatible with the latex and with any other surfactants/dispersants which may be present in the latex composition. By way of example and not limitation, nonionic dispersants include the polyalkylene glycol ethers and condensation products of alkyl phenols, aliphatic alcohols, aliphatic amines or fatty acids with ethylene oxide, propylene oxide or mixtures of ethylene and propylene oxides such as the ethoxylated alkyl phenols or ethoxylated aryl or polyaryl phenols and carboxylic esters solubilized with a polyol or polyoxyethylene; cationic dispersants include quaternary ammonium compounds and fatty amines, anionic dispersants include the oil-soluble (e.g., calcium, ammonium) salts of alkyl aryl sulfonic acids, oil soluble salts of sulfated polyglycol ethers, salts of the esters of sulphosuccinic acid, or half esters thereof with nonionic surfactants, appropriate salts of naphthalene sulfonate condensates and appropriate salts of phosphated polyglycol ethers. In embodiments, the dispersant may be a nonionic polymeric surfactant, a random polymeric dispersant or a sodium salt of a naphthalene sulfonate condensate. In further embodiments, the dispersant may be Atlox™ 4914 (a nonionic polymeric surfactant with a low HLB value) as available from Croda International Plc (Edison, N.J.) or Morwet® D-425 as available from AkzoNobel (Chicago, Ill.).

In embodiments, the active ingredient may be an insecticide, a fungicide, an herbicide or an herbicide safener.

In further embodiments, the active ingredient has a melting point of 70° C., <70° C., <68° C., <66° C., <64° C., <62° C., <60° C., <58° C., <56° C., <54° C., <52° C. or 50° C. In further embodiments, the active ingredient may be a 2,6-dinitroaniline compound. In embodiments, the active ingredient may be benfluralin. In embodiments, the active ingredient is not dissolved in a hydrocarbon solvent.

In further embodiments, the composition described herein may include at least one active ingredient with a melting point of <50° C. and at least one active ingredient with a melting point of from about 50° C. to about 70° C., wherein the at least two active ingredients are co-melted together to provide a solid mixture which is then processed into the composition as described herein. Examples of such a mixture may include trifluralin in a mixture with at least one of benfluralin, ethalfluralin or pendimethalin.

In an embodiment, the active ingredient may be present in the composition from about 18 wt % to about 45 wt %. In certain embodiments, the active ingredient may be present in the composition at from about 20 wt % to about 40 wt %, from about 22 wt % to about 38 wt %, from about 24 wt % to about 36 wt %, from about 26 wt % to about 34 wt %, from about 28 wt % to about 32 wt %, or from about 29 wt % to about 31 wt %.

In particular embodiments, the active ingredient will have low water solubility (less than about 50 mg active ingredient per liter of water at 25° C.) and a melting point from about 50° C. to about 70° C. Suitable active ingredients for use in the described compositions include herbicides such as, for example, anilofos, benzoylprop-ethyl, butralin, clodinofop-propargyl, cyhalofop-butyl, dimethametryn, dithiopyr, ethalfluralin, ethofumesate, fenthiaprop-ethyl, fluoroglycofen-ethyl, fluroxypyr-meptyl, haloxyfop-ethoxyethyl, haloxyfop-P-methyl, ioxynil octanoate, nitrofen, pendimethalin, propaquizafop, quizalopfop-P-tefuryl and trifluralin (when trifluralin is combined with a higher melting active such as, for example, benfluralin, pendimethalin or ethalfluralin). Suitable active ingredients for use in the described compositions also include herbicide safeners such as, for example, cloquintocet-mexyl, flurazole, mefenpyr-diethyl and TI-35. Suitable active ingredients for use in the described compositions also include insecticides such as, for example, azinphos-ethyl, bifenthrin, bromophos, chlorphoxim, crufomate, cyfluthrin, gamma-cyhalothrin, cypermethrin, dialifos, dioxabenzofos, fenoxycarb, fenvalerate, fluenetil, leptophos, pyrimidifen, resmethrin, tebufenpyrad and tetramethrin. Suitable active ingredients for use in the described compositions also include fungicides such as, for example, binapacryl, bupirimate, cyflufenamid, dinobuton, fenitropan, fenoxanil, flusilazole, glyodin, isoprothiolane, nitrothal-isopropyl, proquinazid, pyraclostrobin, pyrazophos and triflumizole.

In embodiments, the composition may contain one or more biocides. Biocides may be present in the composition from about 0.1 wt % to about 1 wt %. In embodiments, the one or more biocides may be present in the composition at 0.1 wt %, 0.2 wt %, 0.3 wt %, 0.4 wt %, 0.5 wt %, 0.6 wt %, 0.7 wt %, 0.8 wt %, 0.9 wt % or 1 wt %. Examples of biocides include, but are not limited to, bactericides, viricides, fungicides, parasiticides, and the like. Examples of biocide active ingredients include, but are not limited to, phenol compounds (such as phenol, thymol, pentachlorophenol, cresol and p-chloro-m-xylenol), aldehydic compounds (such as formaldehyde, glutaraldehyde and paraformaldehyde), acid compounds (such as benzoic acid, sorbic acid, mucochloric acid and mucobromic acid), esters of p-hydroxybenzoic acid (such as methyl-p-hydroxybenzoate and butyl-p-hydroxybenzoate), rare earth salts, amines, disulfides, heterocyclic compounds (such as thiazinium salts, thiazolinones and benzimidazoles), quaternary ammonium salts, organic mercury compounds, hexamethylenebiguanide hydrochlorides, benzalkonium chlorides, polyamino propylbiguanides, and 1-2-benzisothiazoline-3-ones. In embodiments, a composition may comprise Proxel® GXL (Arch Chemicals Inc., Atlanta, Ga.) as a biocide.

In embodiments, the composition may contain one or more rheology aids. Rheology aids may be present in the composition from about 0.1 wt % to about 2 wt %. In certain embodiments, the one or more rheology aids may be present in the composition at from about 0.2 wt % to about 2 wt %, from about 0.4 wt % to about 2 wt %, from about 0.6 wt % to about 2 wt %, from about 0.8 wt % to about 2 wt %, from about 1.0 wt % to about 2 wt %, from about 1.2 wt % to about 2 wt %, from about 1.4 wt % to about 2 wt %, from about 1.6 wt % to about 2 wt % or from about 1.8 wt % to about 2 wt %. Examples of rheology aids include, but are not limited to, aerosils, silicas, oils, clays, smectite clays, bentonite clays, starches and xanthan gums. In embodiments, a composition may comprise Veegum® K (R. T. Vanderbuilt, Norwalk, Conn.) and Kelzan® S (CP Kelco, Atlanta, Ga.) as rheology aids.

In embodiments, the composition may contain one or more antifoam agents. Antifoam agents may be present in the composition from about 0.01 wt % to about 0.1 wt %. In embodiments, the one or more antifoam aids may be present in the composition at 0.01 wt %, 0.02 wt %, 0.03 wt %, 0.04 wt %, 0.45 wt %, 0.05 wt %, 0.06 wt %, 0.07 wt %, 0.08 wt %, 0.09 wt % or 0.1 wt %.

In embodiments of the invention, the median particle size may increase by less than 50% after storage for two weeks at 40° C. after initial preparation of the composition. In embodiments of the invention, the median particle size may increase by less than 75% after storage for six weeks at 40° C. after initial preparation of the composition. In embodiments of the invention, the median particle size may increase by less than 100% after storage for six weeks at 40° C. after initial preparation of the composition. In embodiments of the invention, the median particle size may increase by less than 125% after storage for six weeks at 40° C. after initial preparation of the composition. In embodiments of the invention, the median particle size may increase by less than 150% after storage for six weeks at 40° C. after initial preparation of the composition. In embodiments of the invention, the median particle size may increase by less than 175% after storage for six weeks at 40° C. after initial preparation of the composition. In embodiments of the invention, the median particle size may increase by less than 200% after storage for six weeks at 40° C. after initial preparation of the composition.

Embodiments include methods of using the foregoing compositions. In embodiments, the compositions may be applied as an insecticide, an herbicide, optionally including an herbicide safener, or as a fungicide. In embodiments, the compositions may be applied for the control of unwanted plants, fungi or insects at levels dependent on the concentration of the active ingredient.

The compositions as described herein may be applied in conjunction with one or more other active ingredients to control a wider variety of unwanted plants, fungi or insects. When used in conjunction with the other active ingredients, the presently claimed compositions can be formulated with the other active ingredient or active ingredients as premix concentrates, tank mixed with the other active ingredient or active ingredients for spray application or applied sequentially with the other active ingredient or active ingredients in separate spray applications.

An example of a composition as described herein that may be used in conjunction with another active ingredient comprises an aqueous pre-mix concentrate containing a mixture of benfluralin and the herbicide propyzamide. Such aqueous pre-mix herbicidal concentrates may be diluted from 1 to 2000 fold in water at the point of use depending on the agricultural practices and used in pre-emergent and post-emergent spray applications to control weeds in crops.

The present invention is further described in the following example, which is offered by way of illustration and is not intended to limit the invention in any manner.

Example

Step 1: Preparation of Active Ingredient

Benfluralin was melted at 70° C. and the molten benfluralin was poured into several shallow aluminum pans and allowed to cool to room temperature. Once cool, a mortar and pestle was used to crush the solidified benfluralin into a coarse powder.

Step 2: Preparation of Slurry 227.3 g of the of the benfluralin powder (95% purity) prepared in Step 1 was combined with 190.2 g of water, 30.9 g of Atlox™ 4914, 79.2 g of a 5% solution of Veegum® in water and 3.0 g of Foamaster UDB (Cognis, Cincinnati, Ohio). A low shear mixer with a dispersing blade was used to initially wet the powder and to combine the ingredients for at least one hour. After mixing, a Silverson homogenizer set at 5,000 rpm was used for 20 minutes to reduce the particle size in the composition.

Step 3: Wet Mill Slurry

The composition prepared in Step 2 was introduced into an Eiger mill (EMI, Grayslake, Ill.) filled with glass beads (1.0-1.5 mm diameter) as the milling media to 76% capacity. The composition from Step 2 was then milled to achieve the desired particle size: $d(0.5)=5-7$ microns (μm) and $d(0.9)=20-25$ μm.

Step 4: Post-Milling Addition of Latex

After wet milling of the composition, 353.8 g of the milled composition from Step 3 was combined with 22 g of a 3% Kelzan® S solution in water (containing 0.01% Proxel GXL) and 44.0 g of UCAR™ 162 latex. An additional 23.7 g of water was also added. The Kelzan® S and the latex were incorporated into the composition using low shear mixing with a dispersing blade for 30-45 minutes.

Step 5: Particle Size Stability Measurement

Compositions comprising various amounts of benfluralin (275, 330, 360 and 385 g/L) and latex (0 and 110 g/L, 8, 10, 12 and 15 wt %) were prepared using the procedure described herein and are listed in Table 1. The particle size distribution for each composition was measured after the indicated time periods of storage at 40° C. The particle size analysis was conducted with a Malvern Mastersizer 2000 laser diffraction particle size analyzer and the results are reported in microns (μm) as $d(0.5)$ and $d(0.9)$ values where, for example, a $d(0.5)$ value refers to the volume median particle diameter where 50% of the particles are above this size and 50% are below this size.

TABLE 1

Compositions of samples prepared for storage stability study

| | Sample 50 (g/L) | Sample 78[1] (g/L) | Samples 22A1-22A4 | Samples 22B1-22B4 | Samples 22C1-22C4 |
|---|---|---|---|---|---|
| benfluralin | 360 | 360 | 275 g/L | 330 g/L | 385 g/L |
| Atlox™ 4914 | 51.5 | 51.5 | 51.5 g/L | 51.5 g/L | 51.5 g/L |
| Veegum K | 5.8 | 5.8 | 5.8 g/L | 5.8 g/L | 5.8 g/L |
| UCAR™ 162 latex | 110 | 0 | 8, 10, 12 or 15 wt % | 8, 10, 12 or 15 wt % | 8, 10, 12 or 15 wt % |
| Kelzan S | 1.45 | 1.45 | 1.1 g/L | 1.1 g/L | 1.1 g/L |
| Proxel GXL | 0.5 | 0.5 | 0.5 g/L | 0.5 g/L | 0.5 g/L |
| Antifoam[2] | 5 | 5 | 5 g/L | 5 g/L | 5 g/L |
| Water | balance | balance | balance | balance | balance |

[1]Sample included for comparative purposes
[2]Foamaster UDB

Particle size analysis of Sample 50 containing 110 g/L latex after storage at 40° C.:

| Sample 50 | Initial | 2 weeks at 40° C. |
|---|---|---|
| $d(0.5)/d(0.9)$ | 6.6/25 | 9.1/25.7 |

Particle size analysis of comparative Sample 78 containing 0 g/L latex after storage at 40° C.:

| Sample 78 | Initial | 2 weeks at 40° C. |
|---|---|---|
| $d(0.5)/d(0.9)$ | 5.7/19.0 | 35.4/90.3 |

Particle size analysis of Samples 22A1-22A4 containing 275 g/L benfluralin and 8-15 wt % latex after storage at 40° C.:

| Sample | | 22A1 | 22A2 | 22A3 | 22A4 |
|---|---|---|---|---|---|
| Latex (wt %) | | 8 wt % | 10 wt % | 12 wt % | 15 wt % |
| Storage Conditions | Initial | 6 wks at 40° C. | 6 wks at 40° C. | 6 wks at 40° C. | 5 wks at 40° C. |
| $d(0.5)/d(0.9)$ | 6.0/13.6 | 10.9/41.3 | 9.5/33.8 | 9.9/35 | 8.2/34.5 |

Particle size analysis of Samples 22B1-22B4 containing 330 g/L benfluralin and 8-15 wt % latex after storage at 40° C.:

| Sample | | 22B1 | 22B2 | 22B3 | 22B4 |
|---|---|---|---|---|---|
| Latex (wt %) | | 8 wt % | 10 wt % | 12 wt % | 15 wt % |
| Storage Conditions | Initial | 6 wks at 40° C. | 6 wks at 40° C. | 6 wks at 40° C. | 5 wks at 40° C. |
| $d(0.5)/d(0.9)$ | 5.3/12.9 | 11.6/28.6 | 11.9/31.2 | 11/24.4 | 10.8/29.2 |

Particle size analysis of Sample 22C1-22C4 containing 385 g/L benfluralin and 8-15 wt % latex after storage at 40° C.:

| Sample | | 22C1 | 22C2 | 22C3 | 22C4 |
|---|---|---|---|---|---|
| Latex (wt %) | | 8 wt % | 10 wt % | 12 wt % | 15 wt % |
| Storage Conditions | Initial | 6 wks at 40° C. | 6 wks at 40° C. | 6 wks at 40° C. | 5 wks at 40° C. |
| d(0.5)/d(0.9) | 4.1/9.2 | 10.2/23.2 | 10.9/27.1 | 10.4/24.6 | 10.2/35 |

As is apparent from comparing the results for Sample 50 and Sample 78, the presence of the latex in Sample 50 prevented the rapid growth in particle size that is apparent in Sample 78 after storage of each sample for 2 weeks at 40° C. The change in particle size distribution of a series of samples (Samples 22A1-A4, 22B1-B4 and 22C1-C4) containing varying amounts of benfluralin and latex after storage for 5-6 weeks at 40° C. are also shown.

While this invention has been described in certain embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A composition comprising:
   benfluralin in an amount of about 18% to about 45% by weight of the composition;
   a nonionic dispersant;
   particles of a vinyl acetate, butyl acrylate copolymer latex in an amount of from about 6% to about 15% by weight of the composition; and
   water,
   wherein the particles of the active ingredient and the particles of the latex in the composition remain substantially separate and are dispersed as discrete particles in an aqueous phase.

2. The composition of claim 1, wherein the nonionic dispersant is a nonionic polymeric surfactant.

3. The composition of claim 1, wherein the composition comprises from about 2% to about 8% of the dispersant by weight.

4. The composition of claim 1, wherein the median particle size of the composition increases by less than 200% after storage for six weeks at 40° C. after initial preparation of the composition.

5. The composition of claim 1, wherein the composition comprises from about 2% to about 8% of the dispersant by weight.

6. A method for controlling undesirable plant growth in an area, the method comprising: applying an effective amount of the composition of claim 1 to the area.

7. The method of claim 6, wherein the nonionic dispersant is a nonionic polymeric surfactant dispersant.

8. The method of claim 6, wherein the dispersant is present in the composition in an amount of from about 2% to about 8% by weight.

9. A composition comprising:
   water;
   dispersed discrete particles of an active ingredient in an amount of from about 18% to about 45% by weight of the composition, wherein the active ingredient is selected from the group consisting of azinphos-ethyl, bifenthrin, bromophos, chlorphoxim, cruformate, cyfluthrin, gamma-cyhalothrin, cypermethrin, dialifos, dioxabenzofos, fenoxycarb, fenvalerate, fluenetil, leptophos, pyrimidifen, resmethrin, tebufenpyrad, tetramethrin, binapacryl, bupirimate, cyflufenamid, dinobuton, fenitropan, fenoxanil, flusilazole, glyodin, isoprothiolane, nitrothal-isopropyl, propyzamide, proquinazid, pyraclostrobin, pyrazophos, and triflumizole, or mixtures thereof;
   dispersed discrete particles of a vinyl acetate, butyl acrylate copolymer latex in an amount of from about 6% to about 15% by weight of the composition; and
   a nonionic polymeric surfactant dispersant,
   wherein the particles of the active ingredient and the particles of the latex in the composition remain substantially separate.

10. The composition of claim 9, wherein the median particle size of the composition increases by less than 50% after storage for six weeks at 40° C. after initial preparation of the composition.

11. A method for controlling undesirable fungal pathogens or insects in an area, the method comprising: applying an effective amount of the composition of claim 9 to the area.

12. A composition comprising:
   a nonionic dispersant;
   water;
   dispersed discrete particles of a vinyl acetate, butyl acrylate copolymer latex in an amount of from about 6% to about 15% by weight of the composition; and
   dispersed discrete particles of at least one active ingredient in an amount of from about 18% to about 45% by weight of the composition, wherein the at least one active ingredient is selected from the group consisting of anilofos, benfluralin, benzoylprop-ethyl, butralin, ethalfluralin, ethofumesate, fluoroglycofen-ethyl, fluroxypyr-meptyl, haloxyfop-ethoxyethyl, haloxyfop-methyl, ioxynil octanoate, nitrofen, pendimethalin, quizalofop-P-terfuryl, trifluralin,
   wherein the particles of the at least one active ingredient and the particles of the latex in the composition remain substantially separate.

13. The composition of claim 12, further comprising another active ingredient.

14. The composition of claim 13, wherein the at least one active ingredient comprises benfluralin, and the another active ingredient comprises propyzamide.

15. A method for controlling undesirable plant growth in an area, the method comprising: applying an effective amount of the composition of claim 12 to the area.

* * * * *